US007073227B2

(12) United States Patent
Fukushima et al.

(10) Patent No.: US 7,073,227 B2
(45) Date of Patent: Jul. 11, 2006

(54) BUSH

(75) Inventors: Keisuke Fukushima, Utsunomiya (JP); Yasuo Yamamoto, Utsunomiya (JP)

(73) Assignee: NIFCO Inc., Yokohama (JP)

( * ) Notice: Subject to any disclaimer, the term of this patent is extended or adjusted under 35 U.S.C. 154(b) by 5 days.

(21) Appl. No.: 10/878,689

(22) Filed: Jun. 29, 2004

(65) Prior Publication Data
US 2005/0034267 A1    Feb. 17, 2005

(30) Foreign Application Priority Data
Aug. 14, 2003    (JP)    ............................. 2003-293305

(51) Int. Cl.
  *F16L 5/02*    (2006.01)
(52) U.S. Cl. ........................................ 16/2.2
(58) Field of Classification Search ............ 16/2.1–2.5; 174/65 G, 151, 152 R, 153 G, 152 G; 411/82; 24/114.05, 623, 458; 227/55; 29/244, 235
See application file for complete search history.

(56) References Cited

U.S. PATENT DOCUMENTS

| | | | | |
|---|---|---|---|---|
| 4,169,572 A | * | 10/1979 | Simon | 248/56 |
| 4,183,204 A | * | 1/1980 | Sauter | 368/236 |
| 4,220,808 A | * | 9/1980 | Fujita | 174/48 |
| 4,295,691 A | * | 10/1981 | Rubenthaler | 384/297 |
| 4,299,363 A | * | 11/1981 | Datschefski | 248/56 |
| 4,373,112 A | * | 2/1983 | Mizuno | 174/65 R |
| 4,474,489 A | * | 10/1984 | Simon | 403/195 |
| 4,770,582 A | * | 9/1988 | Junemann et al. | 411/182 |
| 5,090,644 A | * | 2/1992 | Lenker | 248/56 |
| 5,645,282 A | * | 7/1997 | Belter | 277/598 |
| 5,912,431 A | * | 6/1999 | Sheehan | 174/65 R |
| 6,150,608 A | * | 11/2000 | Wambeke et al. | 174/65 G |
| 6,372,995 B1 | * | 4/2002 | Mochizuki et al. | 174/152 G |
| 6,374,455 B1 | * | 4/2002 | Regele et al. | 16/2.1 |
| D466,439 S | * | 12/2002 | Wagner et al. | D11/220 |
| 6,521,833 B1 | * | 2/2003 | DeFreitas | 174/65 R |
| 6,769,851 B1 | * | 8/2004 | Agha et al. | 411/353 |
| 2001/0044984 A1 | * | 11/2001 | Ono et al. | 16/2.5 |
| 2003/0226233 A1 | * | 12/2003 | Katayama | 16/2.1 |

FOREIGN PATENT DOCUMENTS

JP     08285893    * 11/1996

* cited by examiner

*Primary Examiner*—Robert J. Sandy
*Assistant Examiner*—Andre' L. Jackson
(74) *Attorney, Agent, or Firm*—Manabu Kanesaka

(57) ABSTRACT

A bush for holding first and second members includes a shaft portion having two ends, and a flange integrally formed on one of the two ends of the shaft portion to extend radially outwardly therefrom. The flange has at least one first pressing portion capable of deforming in an axial direction of the shaft portion for elastically pressing one of the two second member toward the other.

8 Claims, 4 Drawing Sheets

BUSH

BACKGROUND OF THE INVENTION AND RELATED ART STATEMENT

The present invention relates to a bush to be provided on an axial portion for connecting two members to be relatively rotatable.

In an automobile, a glove box, a center console, and the like are provided as a glove compartment that can be used by an occupant in a driver seat or a passenger seat. In such a glove compartment, there is a structure in which a lid member is rotatably fixed to a storage member. Japanese Patent Publication (Kokai) No. 09-169245 has disclosed such a structure in which a storage member has a box shape and an open face, and a side plate projecting from an inner face of a lid member is overlapped with an outer surface of a sidewall of the storage member. A synthetic resin bush with a flange is screwed into the sidewall of the storage member from the outside of the side plate of the lid member.

In such a glove compartment of an automobile, it is difficult to adjust a gap of a relative rotational connected portion between the storage member and the lid member. When the gap is too large, since the automobile always vibrates, a chattering sound is produced. When the storage member is attached to the lid member too tightly in order to prevent the chattering sound, it is difficult to smoothly open and close the lid member. In other words, in the conventional structure in which the bush is provided on the axial portion of the storage member and the lid member, it is difficult to balance the chattering sound and the smooth operation.

There has been known a method for adjusting a pressure force between the sidewall of the storage member and the side plate of the lid member, in which a disc spring is fitted in a rotational axis. However, it is necessary to provide the disc spring separately, thereby making part management troublesome and increasing the number of assembly steps.

In view of the problem, an object of the invention is to provide a synthetic bush for a glove compartment wherein a chattering sound is decreased and a smooth operation can be made without increasing the number of parts or assembly steps.

Further objects and advantages of the invention will be apparent from the following description of the invention.

SUMMARY OF INVENTION

In order to attain the objects described above, according to a first aspect of the present invention, a synthetic resin bush is provided for holding first and second members to be relatively rotatable around an axial portion thereof. The synthetic resin bush includes a flange for holding the second member (for example, a side plate of a lid) between the flange and the first member (for example, a sidewall of a storage member), and a pressing portion (for example, a cantilever portion) integrated with the flange and capable of elastically deforming in an axial direction for applying a pressing force to the second member.

According to a second aspect of the present invention, a depressed portion (for example, a depression) may be formed in the second member for receiving the flange. Further, another pressing portion (for example, an arc-shaped elastic portion) is integrated with an outer circumference of the flange and capable of elastically deforming in a radial direction for applying a pressing force to an inner circumferential surface of the depressed portion.

In the first aspect of the present invention, it is not necessary to provide an additional member such as a disc spring for applying a contacting force between the first and second members in the axial direction, thereby reducing the number of parts or assembly steps. Also, is it possible to form the synthetic resin bush accuracy and uniformity with an injection molding, thereby obtaining a stable contacting force.

In the second aspect of the invention, the pressing portion of the flange elastically deforms in the radius direction and abuts against the depression receiving the flange. Accordingly, it is possible to improve accuracy of the central position of the bush, and eliminate wobbling in the radius direction. In the invention, it is possible to balance a chattering sound and smooth operation without increasing the number of parts or assembly steps.

DETAILED DESCRIPTION OF PREFERRED EMBODIMENTS

Figure 1:
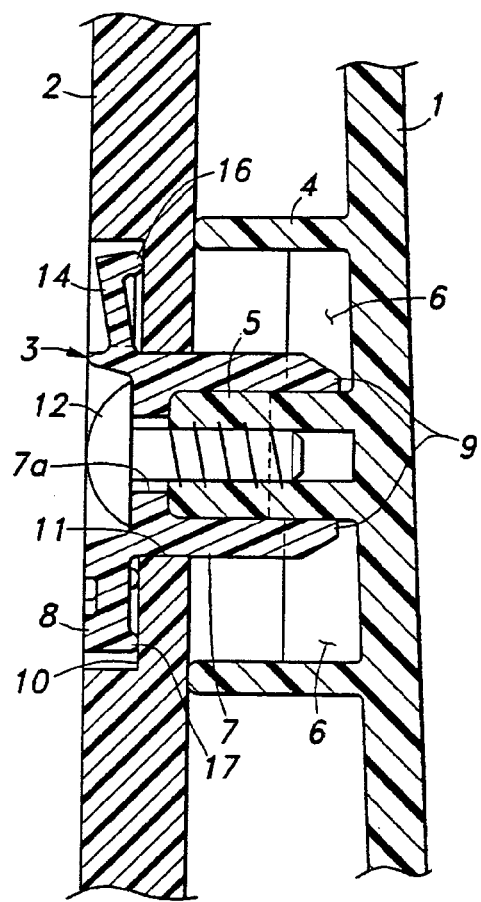
FIG. 1 is a vertical sectional view of a mounted part of a bush according to an embodiment of the present invention.

Hereinafter, embodiments of the present invention will be described in detail with reference to the attached drawings. FIG. 1 shows a portion connected between a storage member wherein the present invention is applied and a lid. In FIG. 1, a sidewall 1 of the storage member, i.e. a first member, is attached to a side plate 2 provided on an inner face of the lid, i.e. a second member, to be rotatable through a bush 3.

A cylinder portion 4 with a relatively short height in an axial direction projects from an outer surface of the sidewall 1 of the storage member. A columnar boss 5 with a tip projecting slightly above an end surface of the cylinder portions 4 in the axial direction is formed at the center of the cylinder portion 4. An inner circumferential surface of the cylinder portion 4 and an outer circumferential surface of the boss 5 are connected with radial ribs 6 having a height about half of the depth of the cylinder portion 4 at a position dividing the circumference into two.

The bush 3 is integrally formed of a synthetic resin (for example, POM) with injection molding, and comprises a cylindrical shaft portion 7 contacting the outer circumference of the boss 5; a flange 8 formed on an outer end of the shaft portion 7; and a pair of detent projections 9 formed on an inner end of the shaft portion 7. A flat cylinder-shaped depression 10 for receiving the flange 8 formed on the outer end of the bush 3 in the axial direction, and a hole 11 penetrating through the center of the depression 10 are formed in the side plate 2 provided on the inner face of the lid member.

The side plate 2 of the lid is placed on the outer surface of the sidewall 1 of the storage member, and the shaft portion 7 inserted through the penetrating hole 11 from the outside of the side plate 2 is fitted into the boss 5 projecting toward the outer surface of the sidewall 1 of the storage member. As a result, the bush 3 regulates the rotational center of the lid relative to the storage member. Then, a tapping screw 12 is screwed in the center of the boss 5 from the outer end of the bush 3 in the axial direction through a penetrating hole 7a provided in the base end side of the shaft portion 7. Accordingly, the sidewall 1 of the storage member is integrally attached to the side plate 2 of the lid in a state that the side plate 2 of the lid is clamped between the sidewall 1 of the storage member and the flange 8 of the bush 3. Also, the bush 3 is fixed to the sidewall 1 of the storage member when a pair of the detent projections 9 engages the radial rib 6 formed on the bottom of the cylinder portion 4.

Figure 2:
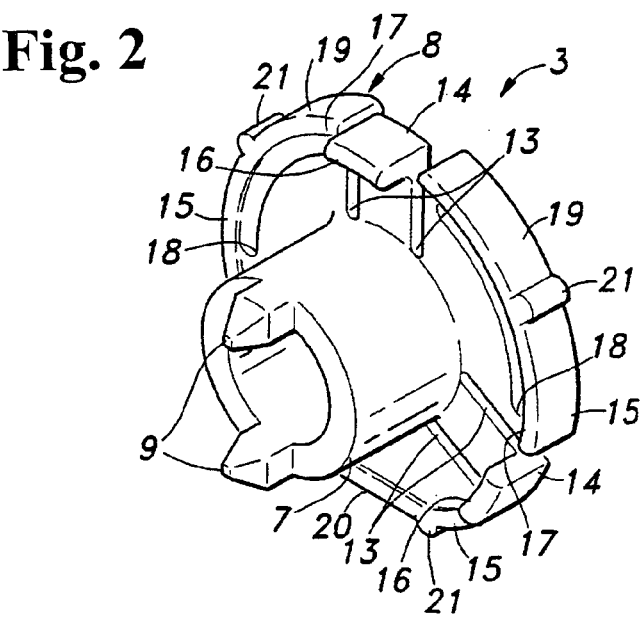
FIG. 2 is a perspective view of the bush according to the embodiment of the present invention.
Figure 3:
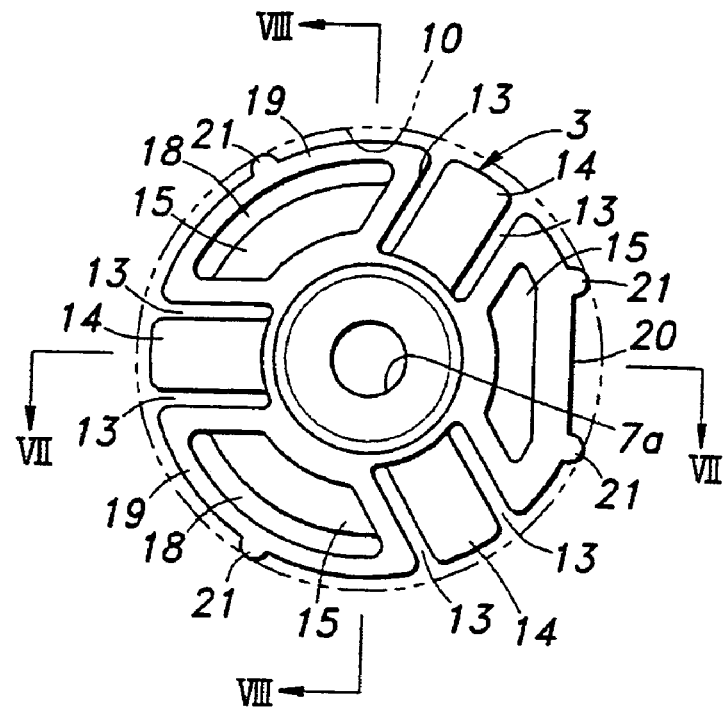
FIG. 3 is a plan view of the bush according to the embodiment of the present invention.
Figure 4:
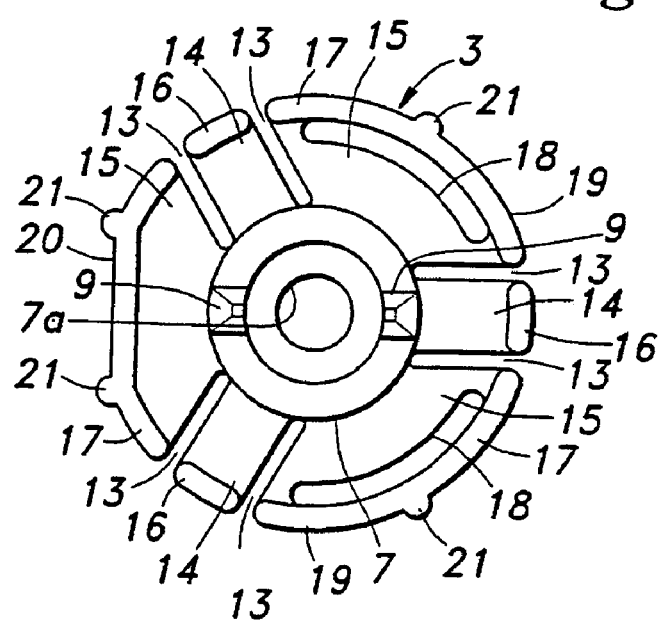
FIG. 4 is a bottom view of the bush according to the embodiment of the present invention.
Figure 5:
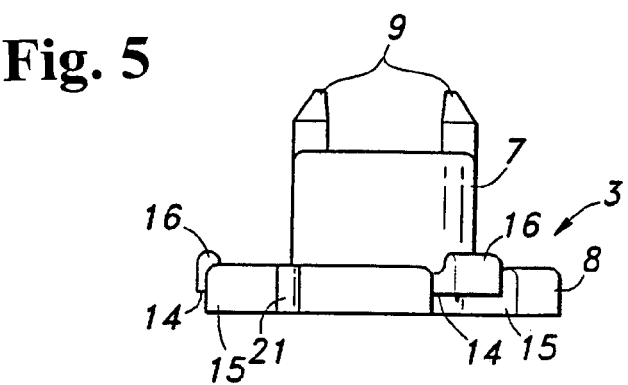
FIG. 5 is a front view of the bush according to the embodiment of the present invention.
Figure 6:
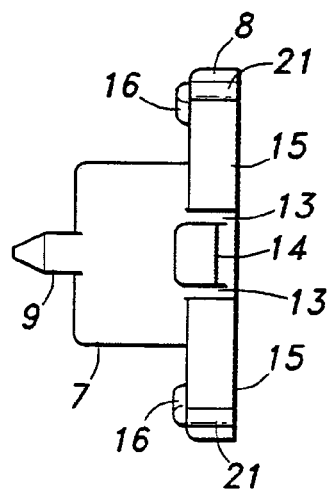
FIG. 6 is a left side view of the bush according to the embodiment of the present invention.
Figure 7:
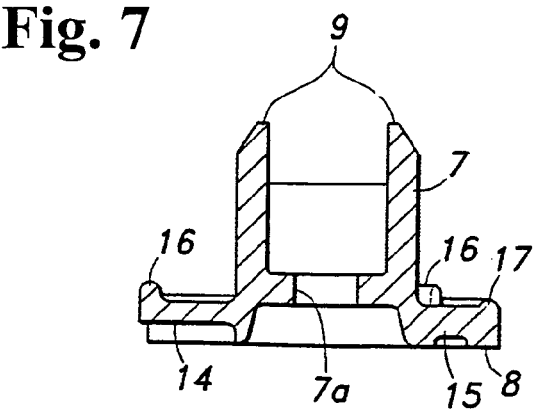
FIG. 7 is a cross sectional view taken along line 7—7 in FIG. 3.
Figure 8:
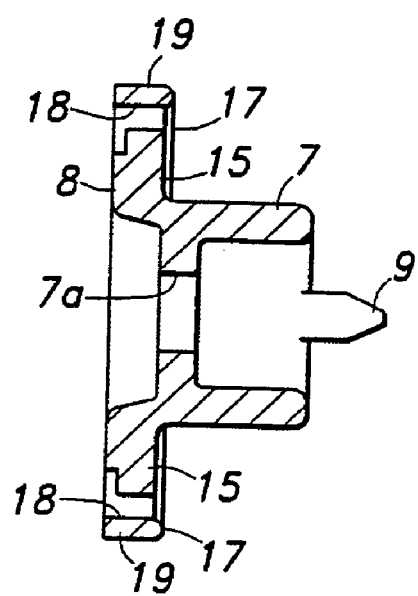
FIG. 8 is a cross sectional view taken along line 8—8 in FIG. 3.

As shown in FIG. 2, cut portions 13 are formed in the flange 8 of the bush 3 in a radius direction to form three cantilever portions 14 and three fan-shaped portions 15. Circumferential strips 16 and 17 having a semicircular cross section are formed at outer circumferential portions of the cantilever portions 14 and the fan-shaped portions 15 facing the bottom face of the depression 10. The strips 16 of the cantilever portions 14 and the strips 17 of the fan-shaped portions 15 are shifted in an axial direction so that the strips 16 of the cantilever portions 14 are located closer to the bottom face of the depression 10.

Arc-shaped slits 18 are formed at outer circumferential portions of two of the three fan-shaped portions 15, so that arc-shaped elastic portions 19 capable of deforming inwardly in the radius direction are formed. A face 20 parallel to a tangential line is formed on the remaining one of the three fan-shaped portions 15, and a part of an outer circumferential surface thereof is cut off. Axial directional strips 21 with a semicircular cross section are formed on both ends of the face 20 parallel to the tangential line and on the centers of the outer circumferential surfaces of the arc-shaped elastic portions 19.

With the structure described above, when the tapping screw 12 is screwed in the center of the boss 5 from the outer end of the bush 3 in the axial direction, the strips 16 of the cantilever portions 14 contact the bottom surface of the depression 10 before the strips 17 of the fan-shaped portions 15 due to the shifted position in the axial direction. When the tapping screw 12 is screwed in and the strips 17 of the fan-shaped portions 15 contact the bottom surface of each depression 10, the cantilever portions 14 bend outwardly in the axial direction. The cantilever portions 14 elastically deform in the axial direction to generate repulsion force, so that the side plate 2 of the lid is pressed in the axial direction against the cylinder portions 4 of the sidewall 1 of the storage portion.

The pressing force of the cantilever portions 14 in the axial direction is determined by a bending amount of the cantilever portions 14. It is possible to set an early bending amount of the cantilever portions 14 when the tapping screw 12 is fully fastened by adjusting a size of the boss 5 projecting from the cylinder portion 4. Also, it is possible to properly and stably set the repulsion force of the cantilever portions 14 by adjusting a thickness or a radial size of the cantilever portion 14, a height of the strip 16, and the like.

The circumferential strips 16 of the cantilever portions 14 have a semicircular cross section so that the lid is opened and closed smoothly without an influence of the resistance of the axial directional pressing force of the cantilever portions 14. Accordingly, combined with the selection of POM for the molding material, it is possible to reduce a sliding resistance and obtain the smooth operation when the lid is opened and closed.

The arc-shaped elastic portions 19 are provided on the outer circumferential side of the flange 8, and the axial directional strips 21 are provided. Further, a distance between the tip of the strip 21 and the inner circumference of the depression 10 is set to be tight. Accordingly, when the strips 21 abut against the inner circumferential surface of the depression 10, the arc-shaped elastic portions 19 divided with the arc-like slits 18 elastically deform inwardly, thereby eliminating wobbling in the radius direction of the lid.

According to the present invention, the synthetic resin bush reduces the chattering sound and provides smooth operation without increasing the number of the parts or assembly steps. Also, the bush is universally applicable on an axial portion of two members relatively rotatably connected together.

The disclosure as disclosed in Japanese Patent Application No. 2003-293305 filed on Aug. 14, 2003 is incorporated herein.

While the invention has been explained with reference to the specific embodiments of the invention, the explanation is illustrative and the invention is limited only by the appended claims.

What is claimed is:

1. A bush for holding first and second members, comprising:
    a shaft portion having first and second ends, and
    a flange integrally formed on the first end of the shaft portion to extend radially outwardly therefrom, said flange having at least one first pressing portion with elasticity capable of deforming in an axial direction of the shaft portion, said at least one first pressing portion having a first projecting portion at an outer periphery thereof projecting toward the second end along the axial direction of the shaft portion, and at least one second pressing portion having a peripheral portion on an outer circumference thereof so that the first projecting portion projects toward the second end beyond the at least one second pressing portion.

2. A bush according to claim 1, wherein said shaft portion includes an insertion hole at a center thereof for inserting a screw therethrough.

3. A bush according to claim 2, wherein said shaft includes detent projections at the second end.

4. A bush according to claim 1, wherein said peripheral portion on the outer circumference thereof is capable of deforming in a radial direction.

5. A bush according to claim 4, wherein said flange is formed by a plurality of first pressing portions, and a plurality of second pressing portions alternately arranged and separated by slits in a circumferential direction thereof, lower surfaces of said first and second pressing portions being located on a same plane.

6. A bush according to claim 5, wherein said first and second pressing portions have projecting portions formed at peripheries thereof and offset from each other in the axial direction.

7. A bush according to claim 5, wherein each of said second pressing portions includes an arc-shaped slit inside the peripheral portion thereof so that the peripheral portion can be deformed radially inwardly.

8. A bush according to claim 5, wherein said first pressing portion has an L-shape in cross section, and is defined by two cut portions.

* * * * *